United States Patent [19]

Nakagaki et al.

[11] Patent Number: 5,274,447
[45] Date of Patent: Dec. 28, 1993

[54] APPARATUS FOR CONVERTING A FIELD FREQUENCY AND A SCANNING LINE NUMBER OF A TELEVISION SIGNAL

[75] Inventors: Hirofumi Nakagaki; Naoshi Usuki, both of Neyagawa, Japan

[73] Assignee: Matsushita Electric Industrial Co., Ltd., Osaka, Japan

[21] Appl. No.: 856,750

[22] Filed: Mar. 24, 1992

[30] Foreign Application Priority Data

Mar. 28, 1991 [JP] Japan .................................. 3-064463

[51] Int. Cl.⁵ .............................................. H04N 7/01
[52] U.S. Cl. .................................................... 358/140
[58] Field of Search .................... 358/11, 140, 167; H04N/7/01

[56] References Cited

U.S. PATENT DOCUMENTS 4,240,101 12/1980 Michael et al. ...................... 358/67; H04N 140 X
4,672,442 6/1987 Yamaguchi et al. .................... 358/; H04N 140 X

FOREIGN PATENT DOCUMENTS 1-221078 9/1989 Japan.

OTHER PUBLICATIONS

ITEJ Technical Report vol. 14, No. 32, pp. 1-6, (Jun. 1990).

*Primary Examiner*—Victor R. Kostak
*Attorney, Agent, or Firm*—Spencer, Frank & Schneider

[57] ABSTRACT

A television standards conversion includes circuitry for generating first and second clocks. Time-axis compression and field frequency conversion circuitry is provided for performing time-axis compression on a signal and converting a field frequency of the 625/50 television standards to a field frequency of the 525/60 television standards by writing a digitized component signal of 625/50 television standards into a first digital memory having only one output port with the first clock and reading the signal from said first digital memory with the second clock. Scanning line interpolation circuitry is provided for performing scanning line interpolation processing for converting odd/even field attribute and converting spatial positions of scanning lines on the signal compressed on the time axis and coverted in field frequency. Time-axis expansion and scanning line number conversion circuitry is provided for expanding the signal on the time axis by writing the signal having interpolated scanning lines into a second digital memory with the second clock and reading the signal from the second digital memory with the first clock, and for converting the number of scanning lines to that of the 525/60 standard by scanning line decimation processing.

2 Claims, 10 Drawing Sheets

FIG. I

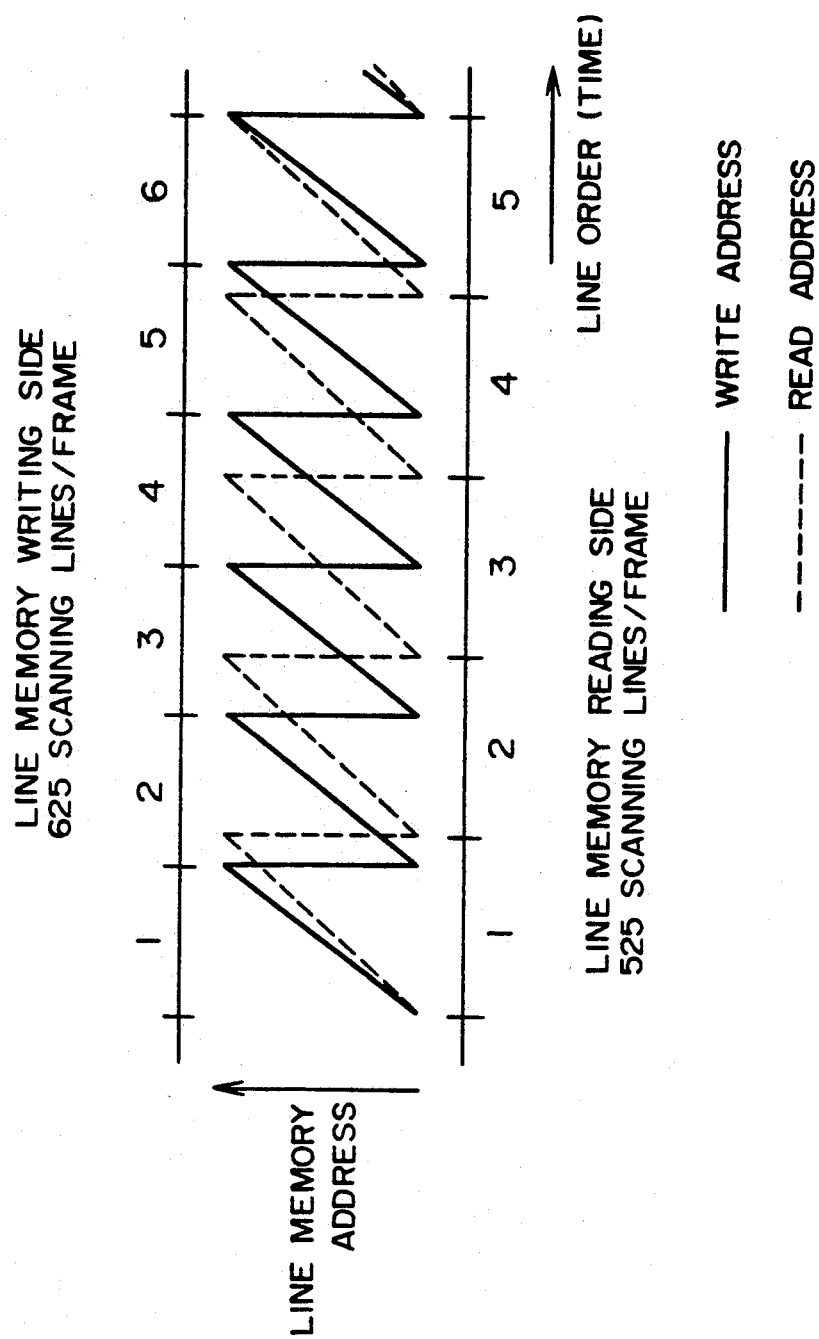

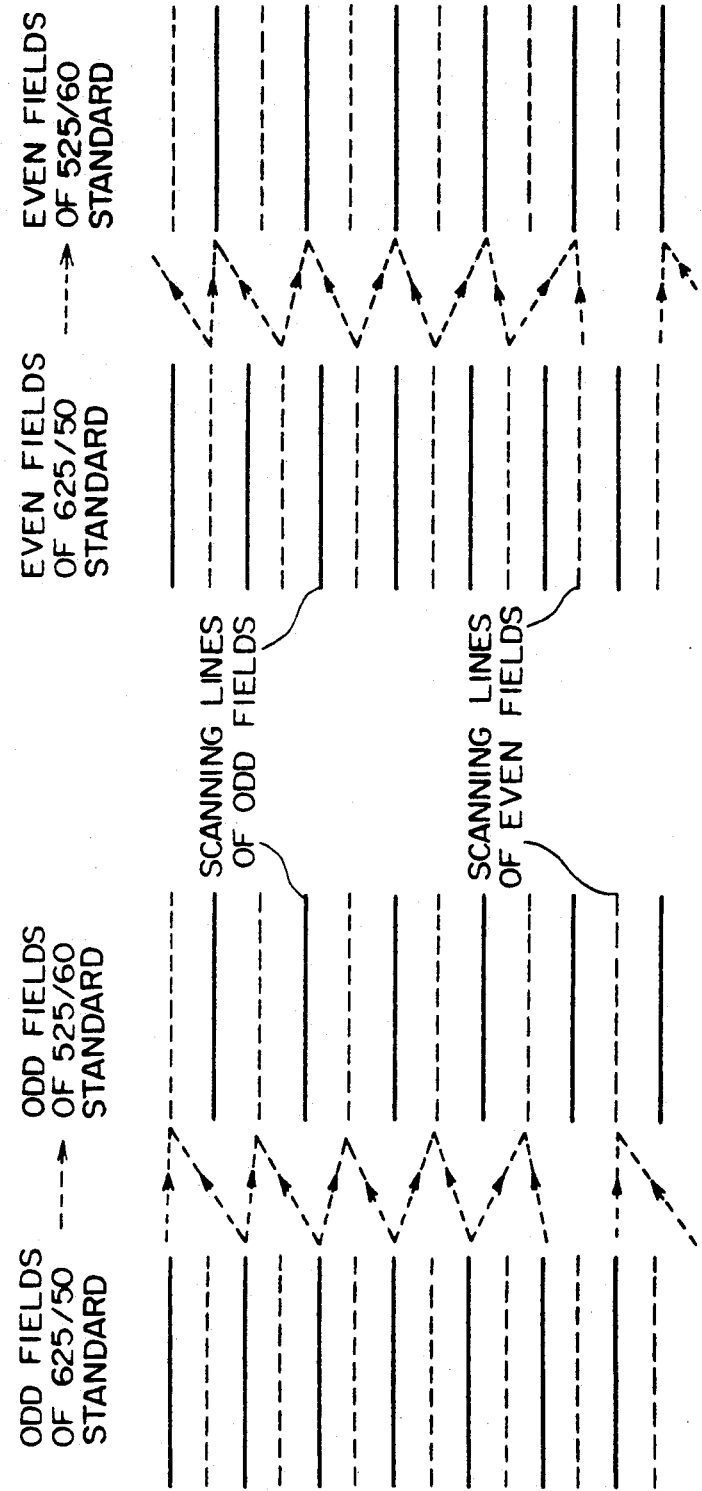

APPARATUS FOR CONVERTING A FIELD FREQUENCY AND A SCANNING LINE NUMBER OF A TELEVISION SIGNAL

BACKGROUND OF THE INVENTION

1. Field of the Invention

The present invention relates to a television standards conversion apparatus for converting the number of scanning lines and the field frequency of video signals into those of another television standards

2. Description of the Related Art

Conversion in television standards from a video signal of the 625/50 standard having 625 of scanning lines and a field frequency of 50 Hz to a video signal of the 525/60 standard having 525 scanning lines and a field frequency of 60 Hz is achieved by conversion in the number of scanning lines and field frequency. Such conversion in the number of scanning lines and field frequency is typically performed by digital signal processing using digital memories and so on as described in ITEJ Technical Report Vol. 14, No. 32, pp. 1-6 (June 1990).

Its configuration and operation will hereafter be described with reference to FIGS. 9 and 10 for the case where a television signal inputted to be converted is a PAL component signal of the 625/50 standard and it is to be converted into an NTSC component signal of 525/60 standard and outputted FIG. 9 is a schematic diagram showing an example of conventional scanning line interpolation processing FIG. 10 is a diagram for explaining how conventional field frequency conversion is performed by means of repetition of a signal of field unit.

A digitized component signal of PAL standard is inputted from an input terminal From the PAL signal having 625 scanning lines per frame, an NTSC signal having 525 scanning lines per frame is produced in a scanning line interpolation circuit by scanning line interpolation processing for converting spatial positions of scanning lines as shown in FIG. 9. In FIG. 9, positions of respective scanning lines correspond to spatial positions on the screen By the scanning line interpolation processing, two PAL scanning lines are weighted and combined to interpolate NTSC scanning lines as shown in FIG. 9 In the conventional example, however, a signal which is not necessary as the NTSC signal as represented by a phantom line is also interpolated in the ratio of approximately six to one. In fact, 525 scanning lines, which are required as the NTSC signal and which are represented by solid lines in FIG. 9, and 100 scanning lines which are not required as the NTSC signal, i e., a total of 625 scanning lines per frame are outputted from the scanning line interpolation circuit to a field memory. On the basis of a control signal fed from a memory control circuit, it is inhibited to write scanning lines, which are included in 625 inputted scanning lines per frame and which are not required as the NTSC signal, into the field memory, whereas only 525 scanning lines which are required as the NTSC signal are written into the field memory. That is to say, scanning line decimation is performed on 625 scanning lines to produce 525 scanning lines. At the time of writing scanning lines into the memory, scanning lines are decimated from 625 to 525 per frame, i.e., at a rate of 5/6. In reading scanning lines from the field memory, therefore, the signal can be read out repetitively by taking a field as the unit at the rate of one field every five fields as shown in FIG. 10. By reading out repetitively the signal corresponding to one field with respect to five-field input, six fields are outputted. Thus the field frequency is converted from 50 Hz of the PAL standard to 60 Hz of the NTSC standard. A component signal, which has been converted from the PAL standard to the NTSC standard by the operation heretofore described, is outputted from an output terminal.

In such a conventional scanning line number and field frequency conversion circuit in the television standards conversion apparatus, scanning line interpolation is performed and thereafter repetition of the field unit for field frequency conversion is performed. Therefore, the state in which odd fields and even fields are correctly outputted alternately is not brought about as shown in FIG. 10. Thus the field sequence relation is not maintained.

In case an odd field and an even field are outputted in a reverse order in the conventional example, therefore, the odd field and the even field are respectively outputted as an even field and an odd field by replacing a vertical synchronizing signal. When this method is used, the state in which odd fields and even fields are normally outputted and the state in which an odd field is outputted as an even field and an even field is outputted as an odd field are repeated every six fields. In the image reproduced from the converted signal of the 525/60 standard, therefore, a flicker of 10 Hz swinging finely upward and downward is caused, resulting in picture quality degradation.

For preventing such a flicker, it is considered to conduct processing of interpolating scanning lines on the readout side of the field memory. By reading out one field repetitively from the field memory every five fields, the field frequency is converted from 50 Hz to 60 Hz. This signal thus converted in field frequency is subject to scanning line interpolation processing for converting spatial positions from scanning lines of 625/50 standard to scanning lines of 525/60 standard. At this time, field attribute alteration is performed. That is to say, if the field sequence relation of the output signal holds true, scanning line interpolation processing from an odd field of 625/50 standard to an odd field of 525/60 standard or scanning line interpolation processing from an even field of 625/50 standard to an even field of 525/60 standard is performed. If the field sequence relation of the output signal is reversed, scanning line interpolation processing from an odd field of 625/50 standard to an even field of 525/60 standard or scanning line interpolation processing from an even field of 625/50 standard to an odd field of 525/60 standard is performed. By doing so, the field sequence relation of the output signal is always maintained and an interpolated scanning line is outputted on the correct position on the screen. Therefore, flickers swinging finely upward and downward are not caused.

In case scanning line interpolation processing is performed on the readout side of the field memory as described above, however, the signal of one field is repetitively read out from the field memory every five fields to convert the field frequency from 50 Hz to 60 Hz. For thus reading the signal of one field repetitively, the number of scanning lines per field must be limited to 5/6. That is to say, readout must be performed while decimating one scanning line every six scanning lines. As a result, precision of scanning line interpolation in the position corresponding to the scanning line decimated on the converted screen is degraded.

SUMMARY OF THE INVENTION

In view of these points, an object of the present invention is to provide a television standards conversion apparatus having scanning line number and field frequency conversion means which does not cause picture quality degradation due to scanning line decimation in conducting scanning line interpolation processing on the readout side of the field memory.

In order to achieve this object, a television standards conversion apparatus of the present invention (claim 1) includes clock generation means for generating a first clock and a second clock; time-axis compression and field frequency conversion means for writing a digitized component signal of 625/50 television standards into a first digital memory having only one output port with the first clock generated by the above described clock generation means, for performing time-axis compression on the signal when reading out the signal stored in the above described first digital memory with the second clock generated by the above described clock generation means, for converting a field frequency of the 625/50 television standards to a field frequency of the 525/60 television standards by reading out the signal repetitively by taking a field as the unit at the rate of one field every five fields, and for outputting the resultant signal as a signal corresponding to 625 scanning lines/60 Hz; scanning line interpolation means for performing scanning line interpolation processing for converting odd/even field attribute and converting spatial positions of scanning lines on the above described signal compressed on the time axis and converted in field frequency; and time-axis expansion and scanning line number conversion means for writing the above described signal having interpolated scanning lines into a second digital memory with the second clock generated by the above described clock generation means, for decimating scanning lines from 625 per frame to 525 per frame when reading out the signal stored in the above described second digital memory with the first clock generated by the above described clock generation means, and for expanding the signal on the time axis to restore the rate of the original clock and output the resultant signal.

A television standards conversion apparatus of the present invention (claim 2) includes field frequency and scanning line number conversion means for writing a digitized component signal of 625/50 television standards into a digital memory having two output standards allowing readout from mutually independent addresses, converting the field frequency and the number of scanning lines to the field frequency and the number of scanning lines of the 525/60 television standards by conducting scanning line decimation processing and repetition of a signal while taking a field as the unit when reading the signal from the above described digital memory having two output standards, and for deriving the resultant signal from a first output terminal; memory control means for deriving, from a second output of the above described digital memory, a signal which is 1H away from the signal subjected to the conversion in field frequency and the number of scanning lines and derived from the first output of the above described digital memory; and scanning line interpolation means for performing scanning line interpolation processing for converting odd/even field attribute and converting spatial positions of scanning lines on the signal, which has been converted in field frequency and the number of scanning lines and derived from the above described first output, by using the above described signal which is 1H away derived from the second output, and for thereby converting the above described signal, which has been converted in field frequency and the number of scanning lines, into a signal of 525/60 standard.

In accordance with the present invention (claim 1), a component signal of 625/50 television standards is converted into a component signal of 525/60 television standards in the above described configuration as described below. That is to say, the field frequency is converted from 50 Hz to 60 Hz in the time-axis compression and field frequency conversion means without decimating scanning lines by compressing a signal on the time axis. Thereafter, scanning line interpolation processing for converting odd/even field attribute and converting spatial positions of scanning lines is performed by the scanning line interpolation means. Further, in the time-axis expansion and scanning line number conversion means, the number of scanning lines is converted from 625 to 525 by decimating unnecessary scanning lines included in the scanning lines interpolated by the scanning line interpolation means and the signal is expanded on the time axis to restore the rate of the original clock and output the resultant signal. As a result, television standards conversion causing less picture quality degradation becomes possible.

In accordance with the present invention (claim 2), a component signal of 625/50 television standards is converted into a component signal of 525/60 television standards as described below. By the field frequency and scanning line number conversion means, the number of scanning lines and the field frequency are respectively converted from 625 and 50 Hz to 525 and 60 Hz by means of scanning line decimation processing and repetition of the signal with a field taken as the unit, and the resultant signal is derived from the first output of the digital memory. In the scanning line interpolation means, scanning line interpolation processing for converting odd/even field attribute and converting spatial positions of scanning lines is performed by deriving, from the second output of the digital memory, a signal which is 1H away from the signal derived from the first output. As a result, television standards conversion causing less picture quality degradation becomes possible.

BRIEF DESCRIPTION OF THE DRAWING

FIG. 4 is a diagram for explaining control of a line memory in an embodiment (claim 1) of the present invention;

FIGS. 5A–5D are schematic diagrams showing an example of scanning line interpolation processing for converting odd/even field attribute and converting spatial positions of scanning lines in an embodiment of the present invention;

FIG. 5A is a schematic diagram showing processing of interpolating scanning lines of odd fields of the 525/60 standard on the basis of scanning lines of odd fields of the 625/50 standard;

FIG. 5B is a schematic diagram showing processing of interpolating scanning lines of even fields of the 525/60 standard on the basis of scanning lines of even fields of the 625/50 standard;

FIG. 5C is a schematic diagram showing processing of interpolating scanning lines of even fields of the 525/60 standard on the basis of scanning lines of odd fields of the 625/50 standard;

FIG. 5D is a schematic diagram showing processing of interpolating scanning lines of odd fields of the 525/60 standard on the basis of scanning lines of even fields of the 625/50 standard;

DESCRIPTION OF THE PREFERRED EMBODIMENTS

Figure 1:
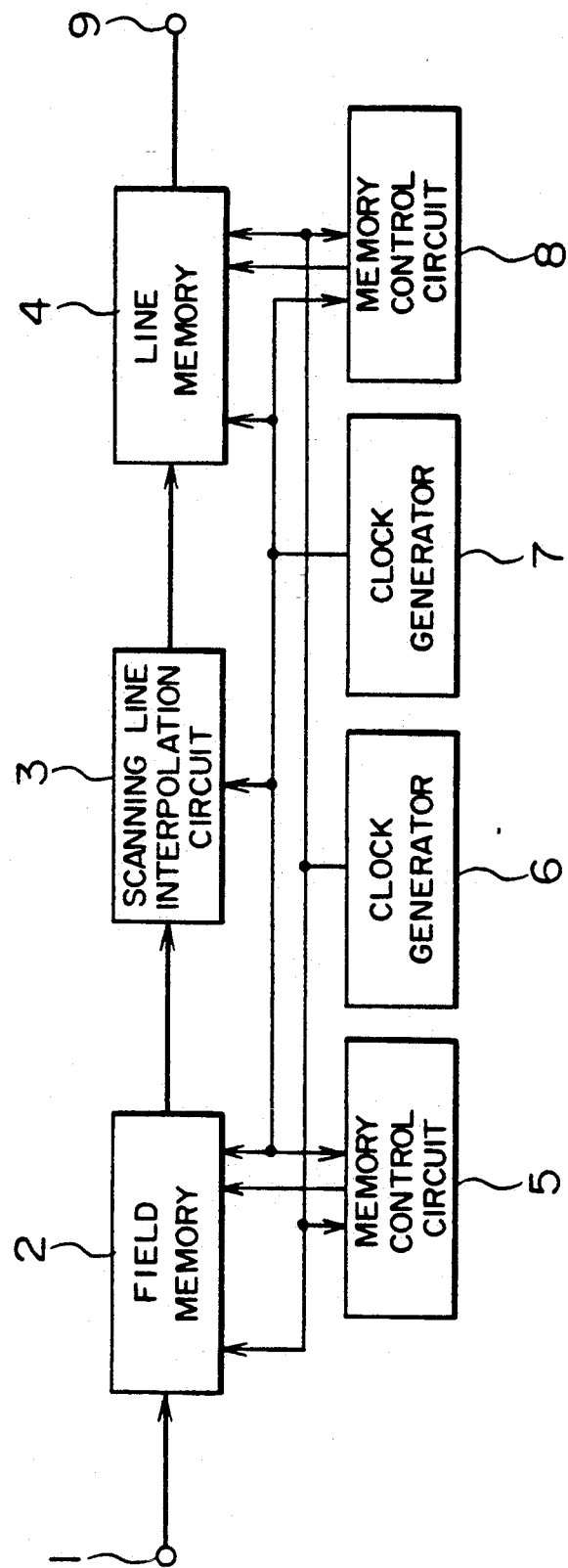
FIG. 1 is a block diagram showing the configuration of a scanning line number and field frequency conversion circuit of an embodiment (claim 1) of a television standards conversion apparatus according to the present invention.

An embodiment (claim 1) of the present invention will hereafter be described by referring to the drawing. FIG. 1 is a block diagram showing the configuration of a scanning line number and field frequency conversion circuit included in an embodiment of a television standards conversion apparatus according to the present invention. In FIG. 1, numeral 1 denotes an input terminal. Digitized component signals of a television standards (625/50 standard) to be converted are multiplexed and inputted to the input terminal 1. Numeral 2 denotes a field memory. By writing signals into the field memory 2 with a clock of a clock generator 6 and reading signals from the field memory 2 with a clock of a clock generator 7 generating the clock having a frequency which is 6/5 times the clock frequency of the clock generated by the clock generator 6, signal compression on the time axis is performed. Together therewith, repetitive readout of the signal of the field unit is performed according to a control signal supplied from a memory control circuit 5, the field frequency being thus converted. Numeral 3 denotes a scanning line interpolation circuit. The scanning line interpolation circuit 3 operates with the clock of the clock generation circuit 7, and performs scanning line interpolation processing for converting odd/even field attribute and converting spatial positions of scanning lines on the output signal of the field memory 2. Numeral 4 denotes a line memory. Signals are written into the line memory 4 with the clock of the clock generator 7, and signals are read from the line memory 4 with the clock of the clock generator 6. Scanning line decimation and signal expansion on the time axis are thus performed on/the output signal of the scanning line interpolation circuit 3 according to a control signal supplied from a memory control circuit 8. A component signal converted to the 525/60 standard is outputted to an output terminal 9.

Assuming that the television signals so inputted to the input terminal 1 as to be converted are multiplexed PAL component signals of the 625/50 standard and those signals are converted to multiplexed NTSC component signals of 525/60 standard and outputted to the output terminal 9, operation of the above described configuration will now be described.

Figure 3:
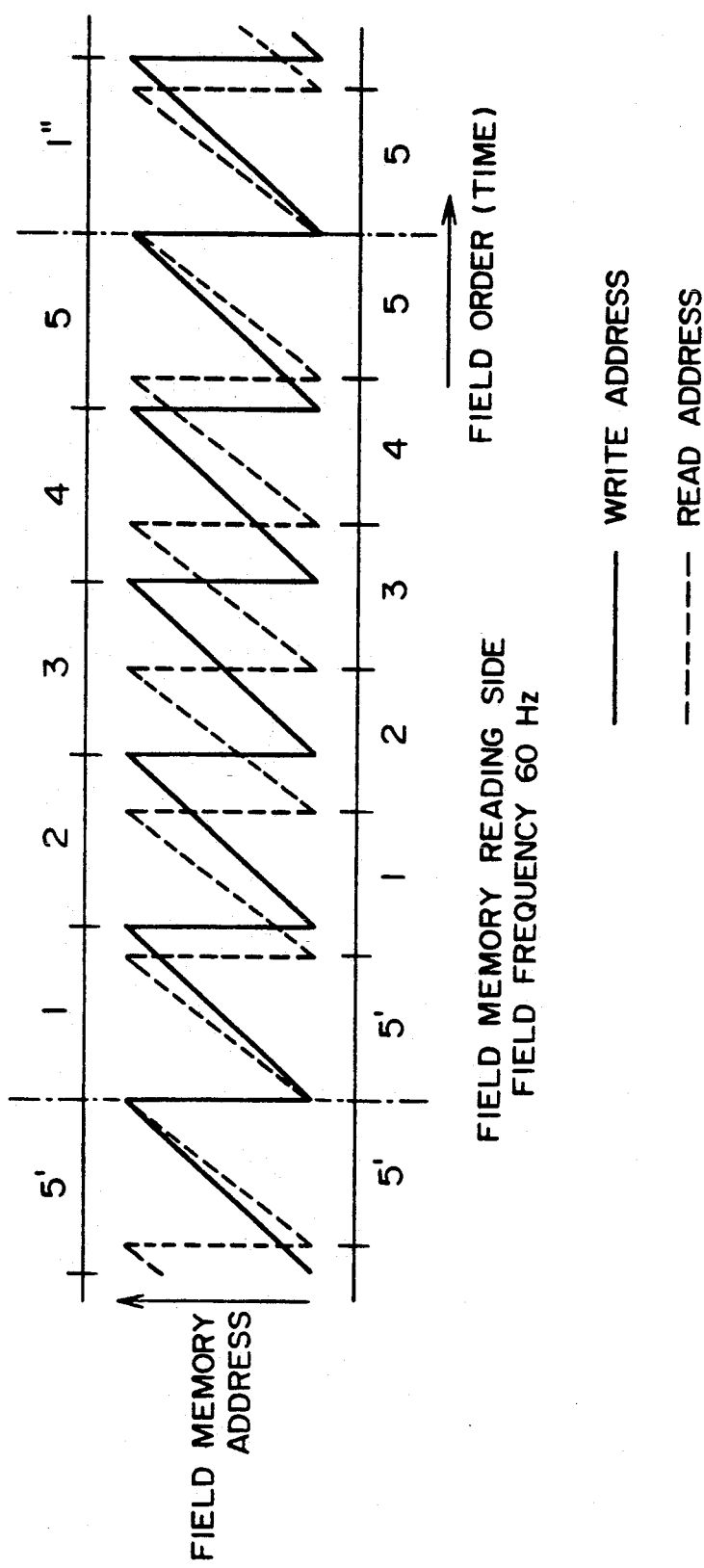
FIG. 3 is a diagram for explaining control of a field memory in an embodiment of the present invention.

When digitized and multiplexed component signals of the PAL standard are inputted at the input terminal 1, the input PAL signals are written into the field memory 2 by the clock of the clock generator 6. Writing signals into the field memory 2 and reading signals from the field memory 2 are conducted for the memory address corresponding to control signals for controlling the write address and the read address outputted from the memory control circuit 5. The relation between the write address and the read address of the field memory 2 controlled by the memory control circuit 5 is shown in FIG. 3. As for the signal stored in the field memory 2 having the write address and read address controlled as shown in FIG. 3, the signal of one field unit is read out repetitively every five fields. That is to say, the signal corresponding to six fields is outputted in the interval of five fields of the input PAL signal. Thereby the field frequency is converted from 50 Hz to 60 Hz. If reading is conducted at the time of reading by the same clock as that of writing, the quantity of the signal read out in one frame interval is limited to five-sixths because the field frequency has been increased to six-fifths. That is to say, only five-sixths of 625 scanning lines of the PAL signal per frame can be read out. Therefore, a clock generator 7 for generating a clock having a frequency equivalent to six-fifths of the clock frequency of the clock generator 6 is used. By reading a signal from the field memory 2 with the clock of the clock generator 7 having a rate equivalent to six-fifths of that of the clock used to write the signal into the field memory 2, the signal is compressed to five-sixths on the time axis. Even if the signal of field unit is repetitively read out at the rate of one field every five fields, all of 625 scanning lines of the PAL signal per frame can thus be read out. By doing so, the signal can be read out from the field memory 2 without decimation even if the field frequency is converted from 50 Hz to 60 Hz. Therefore, picture quality degradation of converted images due to signal decimation can be prevented.

Figure 10:
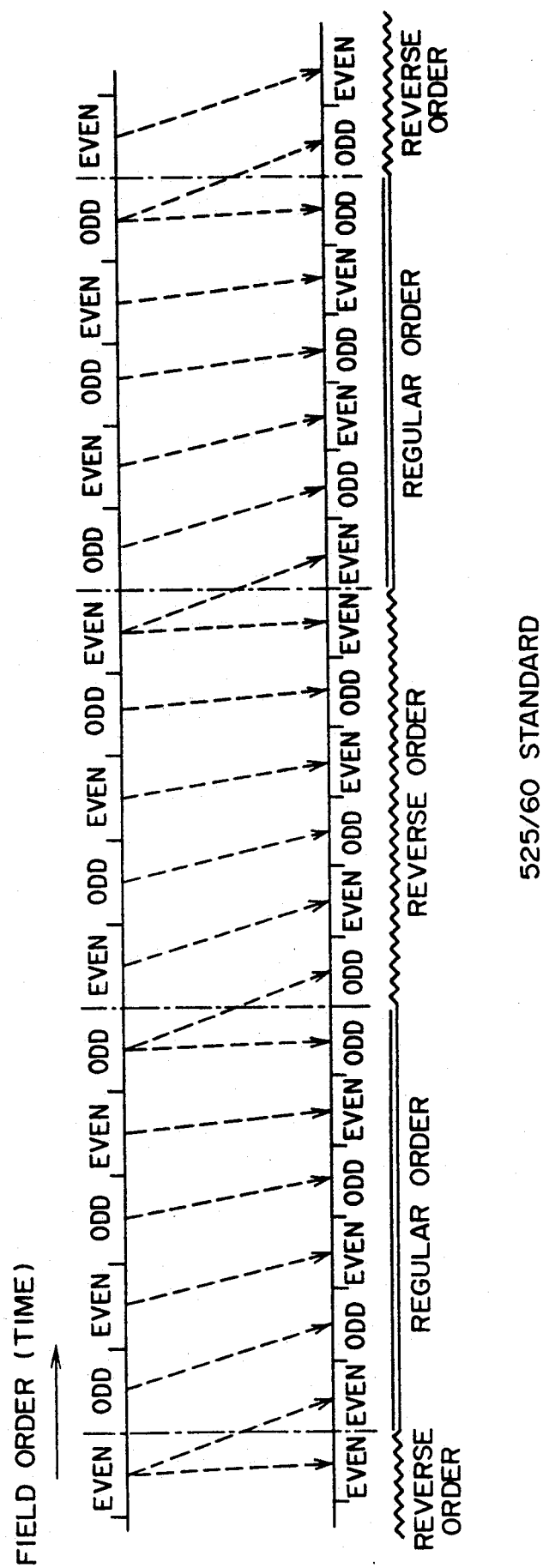
FIG. 10 is a diagram for explaining how conventional field frequency conversion is performed by repetition of a field unit.

The signal subjected to time-axis compression and field frequency conversion has been subjected to repetitive signal processing of field unit for field frequency conversion when that signal is read out from the field memory 2. In the same way as the example shown in FIG. 10, therefore, odd fields and even fields are not arranged alternately and correctly.

Figure 2:
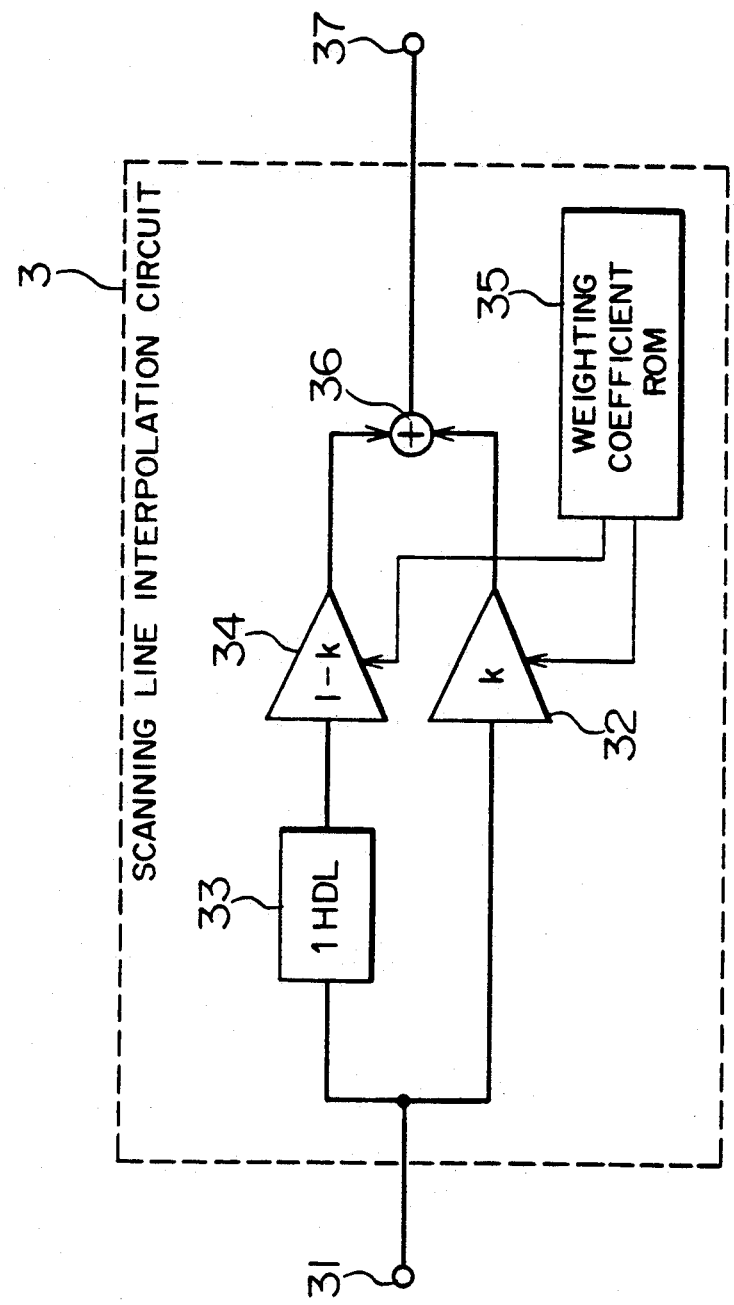
FIG. 2 is a block diagram of a scanning line interpolation circuit in an embodiment (claim 1) of the present invention.
Figure 5B:
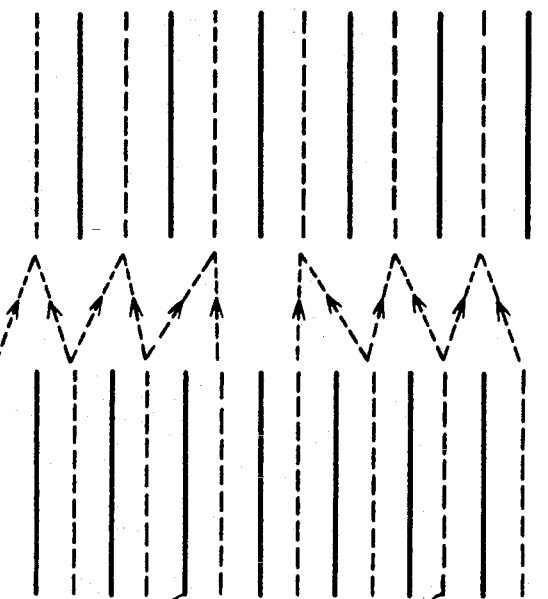
Figure 5A:
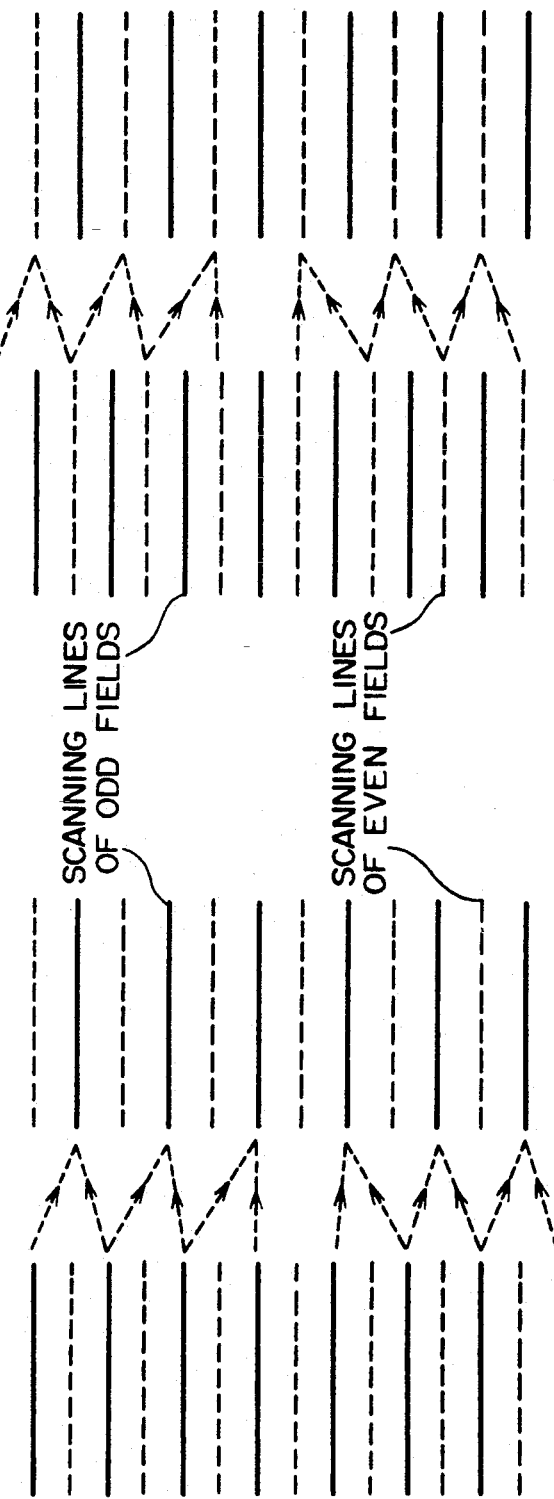
Figure 9:
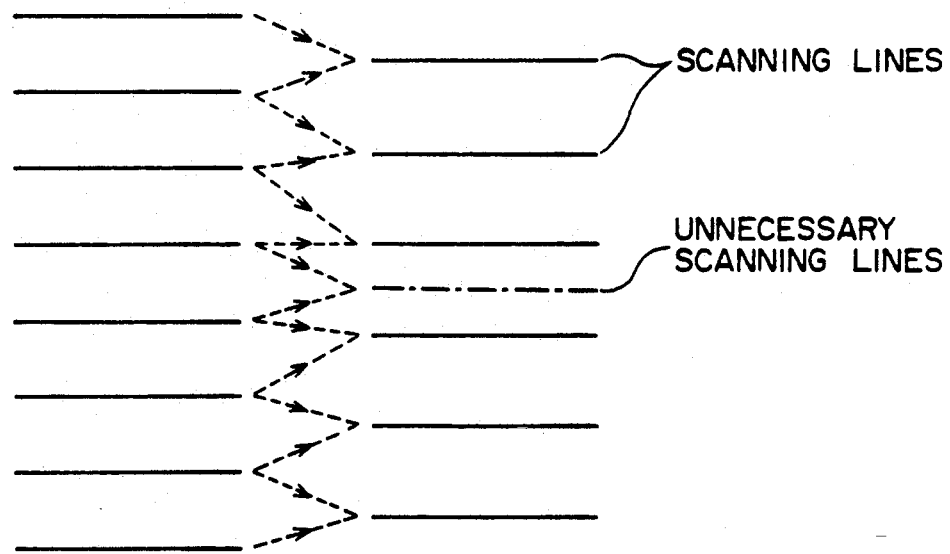
FIG. 9 is a schematic diagram showing an example of conventional scanning line interpolation processing.

In the scanning line interpolation circuit 3, therefore, scanning line interpolation processing is so conducted that odd fields and even fields may be alternately outputted correctly. The configuration of the scanning line interpolation circuit 3 is shown in FIG. 2. When the signal read out from the field memory 2 is inputted to an input terminal 31 of the scanning line interpolation circuit 3, the input signal is so weighted by a coefficient multiplier 32 as to be increased k times. Further, a signal delayed in a 1H delay unit 33 by 1H as compared with the input signal is so weighted by a coefficient multiplier 34 as to be increased (1−k) times. The input signal increased k times and the 1H delay signal increased (1−k) times are added together by an adder 36, and the resultant sum signal is outputted from an output terminal 37 as an interpolation signal. The weighting coefficient k for scanning line interpolation depends upon the relative positions of inputted scanning lines and interpolated scanning lines, and it can be selected out of five values: 1, ¾, 2/4, ¼ and 0. Weighting coefficients corresponding to scanning line positions are stored in a weighting coefficient ROM 35. Scanning line interpolation processing is processing for correcting the difference in spatial position between the PAL signal and the NTSC signal. In the present example, however, conversion of odd/even field attribute is also conducted at the same time. That is to say, scanning line interpolation processing is so performed that fields of the output signal may keep the field sequence relation as described below. When odd fields and even fields of the signal read out from the field memory 2 are arranged correctly in order, odd field scanning lines of the 525/60 standard are interpolated on the basis of odd field scanning lines of the 625/50 standard as shown in FIG. 5A or even field scanning lines of the 525/60 standard are interpolated on the basis of even field scanning lines of the 625/50 standard as shown in FIG. 5B. When odd fields and even fields of the signal read out from the field memory 2 have interchanged order, even field scanning lines of the 525/60 standard are interpolated on the basis of odd field scanning lines of the 625/50 standard as shown in FIG. 5C or odd field scanning lines of the 525/60 standard are interpolated on the basis of even field scanning lines of the 625/50 standard as shown in FIG. 5D. Scanning line interpolation processing according to conversion of the odd/even field attribute is thus performed. By thus switching four ways of scanning line interpolation processing, odd fields and even fields are outputted alternately and correctly. Switching of scanning line interpolation processing is implemented by preparing weighting coefficients k corresponding to four ways of scanning line interpolation processing in the weighting coefficient ROM 35 of the scanning line interpolation circuit 3 and making a selection out of those weighting coefficients according to the scanning line interpolation processing. In the same way as the example of FIG. 9, not only 525 scanning lines needed as the NTSC signal are interpolated but also a signal which is not necessary as the NTSC is interpolated at the rate of one scanning line approximately every six scanning lines, on the basis of 625 scanning lines per frame inputted to the scanning line interpolation circuit 3. Therefore, 625 scanning lines in total per frame are outputted from the scanning line interpolation circuit 3.

The signal outputted from the scanning line interpolation circuit 3 is inputted to the line memory 4. Writing a signal into the line memory 4 is conducted by the clock of the clock generator 7. At the time of outputting, reading the signal from the line memory 4 is conducted by the clock of the clock generator 6. As described before, the clock of the clock generator 6 has a frequency equivalent to five-sixths of that of the clock of the clock generator 7. Therefore, the signal outputted from the line memory 4 is expanded on the time axis and the clock rate is restored to the rate used at the time of input. At this time, the write address and read address of the line memory 4 are controlled by the memory control circuit 8 as shown in FIG. 4. Whereas 625 scanning lines per frame are written into the line memory 4, scanning lines are read out while they are being decimated at the rate of one scanning line every six scanning lines. As a result, 525 scanning lines per frame are outputted. The memory control circuit 8 controls the write address and read address of the line memory 4 so that scanning lines decimated at this time may become 100 scanning lines per frame which are included in 625 scanning lines per frame interpolated by the scanning line interpolation circuit 3 and which are not needed as the NTSC signal. In this way, multiplexed component signals converted into the NTSC standard with the field frequency of 60 Hz and the number of scanning lines of 525 are outputted to an output terminal 9.

In the present embodiment heretofore described, the signal is temporarily compressed on the time axis in the course of processing by using different clocks for digital memory writing and reading operation. Thereby, conversion of the field frequency can be realized without losing a signal. As a result, degradation of the converted picture quality can be suppressed. Further, by switching scanning line interpolation processing so that the field sequence relation of the converted output signal may always hold good, converted images with less flicker are obtained.

Subsequently, another embodiment (claim 2) of the present invention will be described by referring to the drawing.

Figure 6:
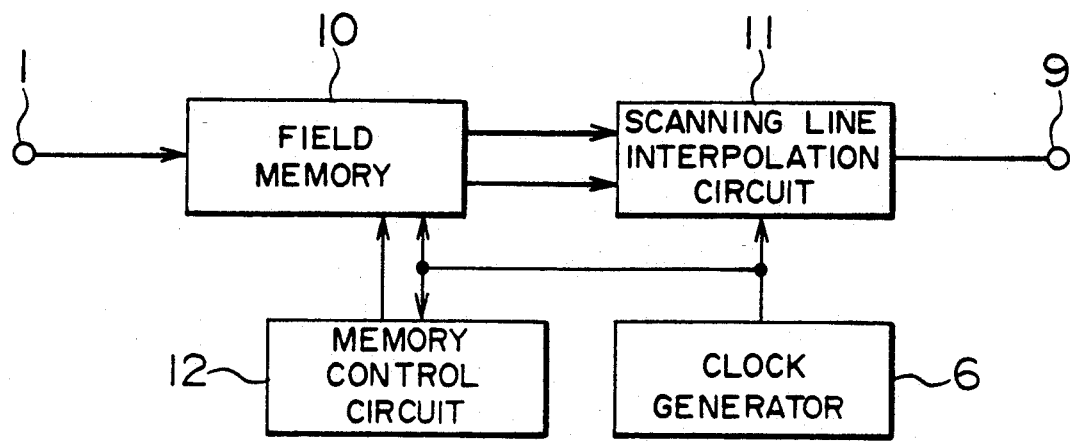
FIG. 6 is a block diagram showing the configuration of a scanning line number and field frequency conversion circuit of another embodiment (claim 2) of a television standards conversion apparatus according to the present invention.

FIG. 6 is a block diagram showing the configuration of a scanning line number and field frequency conversion circuit included in another embodiment of a television standards conversion apparatus according to the present invention. In FIG. 6, numeral 1 denotes an input terminal. Digitized and multiplexed component signals of the 625/50 standard are inputted to the input terminal 1. Numeral 10 denotes a field memory. Signals are written into or read from the field memory 10 by the clock of the clock generator 6. The signal of a field unit is repetitively read out according to a control signal fed from a memory control circuit 12, the field frequency being converted. The field memory 10 is a memory having two independent output standards. Via respective outputs, signals can be read out from different memory addresses. Numeral 11 denotes a scanning line interpolation circuit. With respect to the output signal of the field memory 10, the scanning line interpolation circuit 11 conducts the scanning line interpolation processing for converting the odd/even field attribute and converting the spatial positions of scanning lines. Further, the scanning line interpolation circuit 11 outputs multiplexed component signals converted to the 525/60 standard to the output terminal 9.

Figure 7:
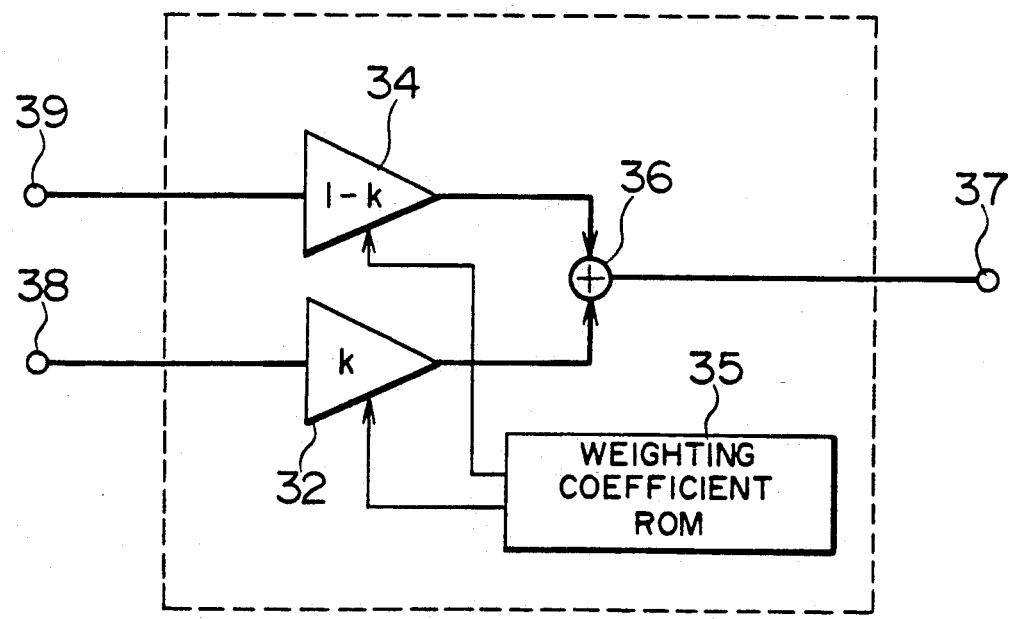
FIG. 7 is a block diagram of a scanning line interpolation circuit in another embodiment (claim 2) of the present invention.
Figure 8:
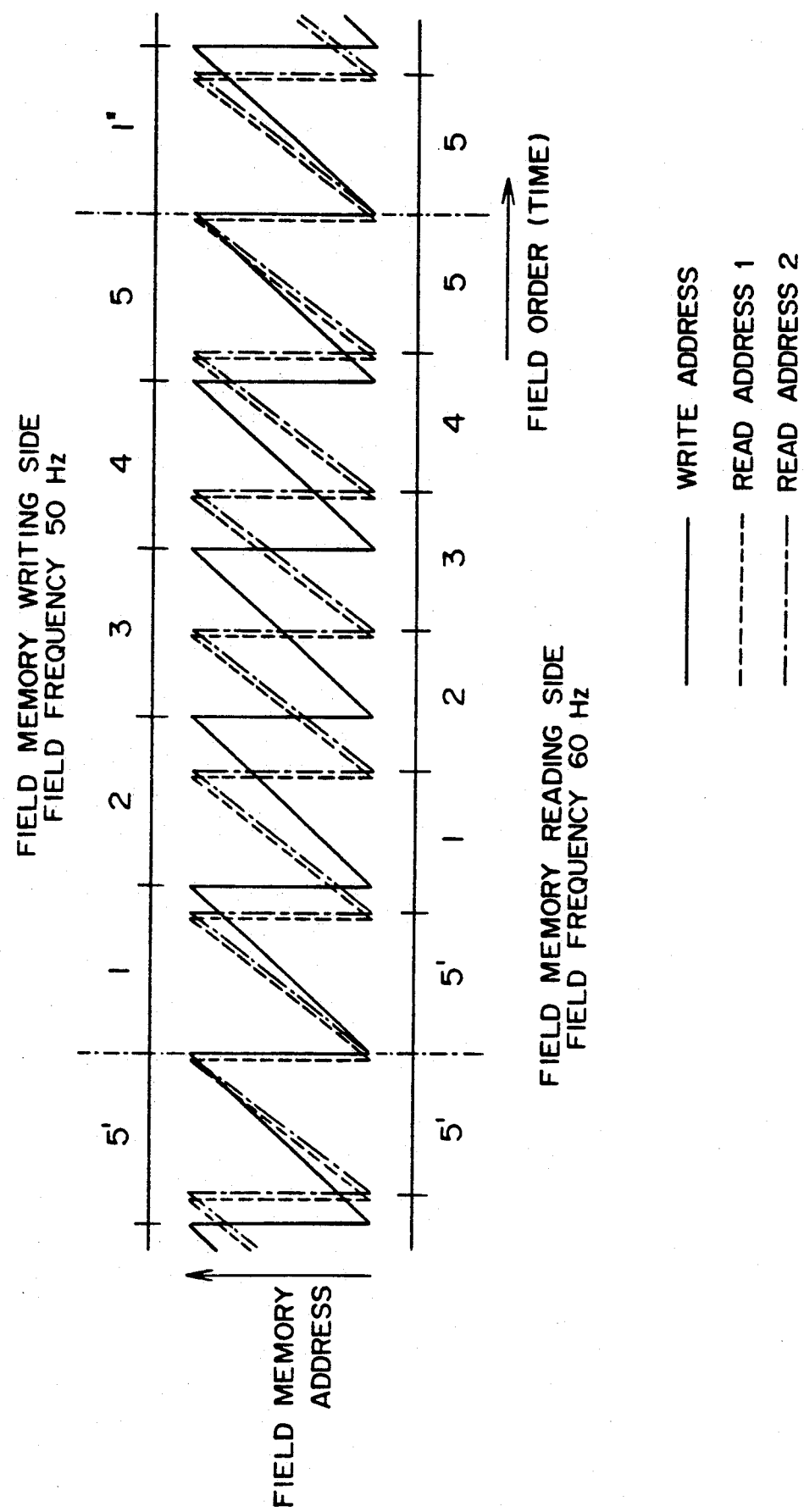
FIG. 8 is a diagram for explaining control of a field memory in another embodiment of the present invention.

Assuming that the television signals so inputted to the input terminal 1 as to be converted are multiplexed PAL component signals of the 625/50 standard and those signals are converted to multiplexed NTSC component signals of 525/60 standard and outputted to the output terminal 9, operation of the above described configuration will now be described. When digitized and multiplexed component signals of the PAL standard are inputted at the input terminal 1, the input PAL component signals are written into the field memory 10 by the clock of the clock generator 6. Writing signals into the field memory 10 and reading signals from the field memory 10 are conducted for the memory address corresponding to control signals for controlling the write address and the read address outputted from the memory control circuit 12. The relation between the write address and the read address of the field memory 10 controlled by the memory control circuit 12 is shown in FIG. 8. As for the signal stored in the field memory 10 having the write address and read address controlled as shown in FIG. 8, the signal of one field unit is read out repetitively every five fields. That is to say, the signal corresponding to six fields is outputted in the interval of five fields of the input PAL signal. Thereby the field frequency is converted from 50 Hz to 60 Hz. By increasing the field frequency 6/5 times, the quantity of the signal read out from one output of the field memory 10 in one frame interval is limited to five-sixths. That is to say, only five-sixths of inputted 625 scanning lines of the PAL signal per frame can be read out. In reading a signal from the field memory 10, therefore, scanning lines are decimated at the rate of one scanning line approximately every six scanning lines. From one output, 525 scanning lines per frame are outputted with the field frequency of 60 Hz. The output signal of the field memory 10 undergoes scanning line interpolation processing in the scanning line interpolation circuit 11. The configuration of the scanning line interpolation circuit 11 is shown in FIG. 7. Since the scanning line interpolation processing is processing for interpolating an NTSC scanning line on the basis of two PAL scanning lines which are 1H away from each other, read addresses of the two output standards are so controlled by the memory control circuit 12 that signals which are 1H away from each other may always be read out from two outputs of the field memory 10. In addition, read addresses are so controlled that PAL scanning lines corresponding to the NTSC scanning line interpolated by the scanning line interpolation processing, i.e., PAL scanning lines spatially adjacent to the interpolated NTSC scanning line may be outputted from respective outputs. The signal fed from the second output of the field memory 10 is always delayed by 1H as compared with the signal fed from the first output. Therefore, the signal fed from the first output of the field memory 10 is the signal of the lower scanning line spatially adjacent to the interpolated NTSC scanning line, whereas the signal fed from the second output of the field memory 10 is the signal of the upper scanning line spatially adjacent to the interpolated NTSC scanning line.

The signal read out in the above described relation and fed from the first output of the field memory 10 is inputted to an input terminal 38 of the scanning line interpolation circuit 11. The signal fed from the second output of the field memory 10 is inputted to an input terminal 39 of the scanning line interpolation circuit 11. The signals fed to the input terminals 38 and 39 are increased in magnitude k times and (1−k) times by coefficient multipliers 32 and 34, respectively. The resultant signals are added together in an adder 36 and outputted to an output terminal 37. The weighting coefficient k for scanning line interpolation depends upon the relative positions of inputted scanning lines and interpolated scanning lines, and it can be selected out of five values: 1, ⅔, 2/4, ⅓ and 0. Weighting coefficients corresponding to scanning line positions are stored in a weighting coefficient ROM 35. Scanning line interpolation processing is processing for correcting the difference in spatial position between the PAL signal and the NTSC signal. However, conversion of odd/even field attribute is also conducted at the same time. The signal read out from the field memory 10 has been subjected to repetitive readout of signal of a field unit at the rate of one field every five fields for field frequency conversion. In the same way as the example shown in FIG. 10, therefore, odd fields and even fields are not arranged alternately and correctly. In the scanning line interpolation circuit 11, therefore, scanning line interpolation processing is so switched that fields of the output signal may keep the field sequence relation. That is to say, scanning line interpolation processing is performed as described below. When odd fields and even fields of the output signal of the field memory 10 are arranged correctly in order, odd field scanning lines of the 525/60 standard are interpolated on the basis of odd field scanning lines of the 625/50 standard as shown in FIG. 5A or even field scanning lines of the 525/60 standard are interpolated on the basis of even field scanning lines of the 625/50 standard as shown in FIG. 5B. When odd fields and even fields of the output signal of the field memory 10 have interchanged order, even field scanning lines of the 525/60 standard are interpolated on the basis of odd field scanning lines of the 625/50 standard as shown in FIG. 5C or odd field scanning lines of the 525/60 standard are interpolated on the basis of even field scanning lines of the 625/50 standard as shown in FIG. 5D. Scanning line interpolation processing according to conversion of the odd/even field attribute is thus performed, 525 NTSC scanning lines being thus interpolated. By thus switching four ways of scanning line interpolation processing odd fields and even fields are outputted alternately and correctly. Switching of scanning line interpolation processing is implemented by preparing weighting coefficients k corresponding to four ways of scanning line interpolation processing in the weighting coefficient ROM 35 of the scanning line interpolation circuit 11 and making a selection out of those weighting coefficients according to the scanning line interpolation processing. In this way, multiplexed component signals converted to the NTSC standard with the field frequency of 60 Hz and the number of scanning lines of 525 are outputted to the output terminal 9.

In the present embodiment heretofore described, it is possible to read out efficiently the signal required to interpolate scanning lines and achieve conversion of the field frequency by using the digital memory having two output standards. Therefore, degradation of the converted picture quality can be suppressed. Further, by switching scanning line interpolation processing so that the field sequence relation of the converted output signal may always hold good, converted images with less flicker are obtained.

As evident from the embodiments heretofore described, the present invention makes it possible to provide a television standards conversion apparatus free from flickers due to inversion of odd fields and even fields and free from picture quality degradation due to lowering in precision of scanning line interpolation resulting from decimation of scanning lines.

The present invention is not limited to the aspects of the above described embodiments.

We claim:

1. A television standards conversion apparatus comprising:
 clock generation means for generating a first clock and a second clock; p1 time-axis compression and field frequency conversion means for performing time-axis compression on a signal and converting a field frequency of the 625/50 television standards to a field frequency of the 525/60 television standards by writing a digitized component signal of 625/50 television standards into a first digital memory having only one output port with the first clock generated by said clock generation means and reading the signal from said first digital memory with the second clock generated by said clock generation means;

scanning line interpolation means for performing scanning line interpolation processing for converting odd/even field attribute and converting spatial positions of scanning lines on said signal compressed on the time axis and converted in field frequency; and time-axis expansion and scanning line number conversion means for expanding the signal on the time axis by writing said signal having interpolated scanning lines into a second digital memory with the second clock generated by said clock generation means and reading the signal from said second digital memory with the first clock generated by said clock generation means, and for converting the number of scanning lines to that of the 525/60 standard by means of scanning line decimation processing.

2. A television standards conversion apparatus comprising:

field frequency and scanning line number conversion means for writing a digitized component signal of 625/50 television standards into a digital memory having two output standards allowing readout from mutually independent addresses, for converting the field frequency and the number of scanning lines to the field frequency and the number of scanning lines of the 525/60 television standards when reading the signal from said digital memory, and for deriving the resultant signal from a first output terminal;

memory control means for deriving, from a second output of said digital memory, a signal which is 1H away from said signal subjected to the conversion in field frequency and the number of scanning lines and derived from the first output of said digital memory; and scanning line interpolation means for performing scanning line interpolation processing for converting odd/even field attribute and converting spatial positions of scanning lines on said signal converted in field frequency and derived from said first output, by using said signal which is 1H away derived from said second output, and for thereby converting said signal converted in field frequency into a signal of 525/60 standard.

* * * * *